US012557921B1

(12) United States Patent (10) Patent No.: US 12,557,921 B1
Zhang (45) Date of Patent: Feb. 24, 2026

(54) FOLDING FRAME

(71) Applicant: XIAMEN HONOR INDUSTRY AND TRADING CO., LTD, Xiamen (CN)

(72) Inventor: Jian Yong Zhang, Xiamen (CN)

(73) Assignee: XIAMEN HONOR INDUSTRY AND TRADING CO., LTD., Xiamen (CN)

( * ) Notice: Subject to any disclaimer, the term of this patent is extended or adjusted under 35 U.S.C. 154(b) by 0 days.

(21) Appl. No.: 19/280,226

(22) Filed: Jul. 25, 2025

(30) Foreign Application Priority Data

Apr. 1, 2025   (CN) .......................... 202520596185.0
Apr. 1, 2025   (CN) .......................... 202520596673.1

(51) Int. Cl.
*A47D 9/00* (2006.01)
*F16C 11/04* (2006.01)

(52) U.S. Cl.
CPC .............. *A47D 9/005* (2013.01); *F16C 11/04* (2013.01)

(58) Field of Classification Search
CPC ...... A47D 9/005; A47D 7/002; A47D 13/061; A47D 13/06; A47D 13/00; A47D 13/063; F16C 11/04
USPC .......................................................... 5/99.1
See application file for complete search history.

(56) References Cited

U.S. PATENT DOCUMENTS 5,611,634 A * 3/1997 Wang ................... A47D 13/063
5/98.1
5,819,342 A * 10/1998 Williams ............. A47D 13/063
5/98.1

6,305,037 B1 * 10/2001 Cheng ................... A47D 13/063
5/99.1
6,317,907 B1 * 11/2001 Wang .................... A47D 13/063
5/98.1
7,594,285 B2 * 9/2009 Chen ..................... A47D 13/063
248/167
7,694,361 B1 * 4/2010 Chen .................... A47D 13/063
5/98.1
2007/0017025 A1 * 1/2007 Myer ..................... A47D 7/002
5/99.1
2013/0239382 A1 * 9/2013 Cheng ................... A47D 7/002
403/33
2013/0240815 A1 * 9/2013 Wiegmann ........... A47D 13/061
256/25
2016/0338506 A1 * 11/2016 Yang ..................... A47D 13/063
2017/0280892 A1 * 10/2017 Zhang .................. A47D 13/063

* cited by examiner

*Primary Examiner* — Myles A Throop

(74) *Attorney, Agent, or Firm* — Jose Cherson Weissbrot

(57) ABSTRACT

A folding frame is provided, including a retractable folding component and a fence. The fence includes folding guard-rails and upright rods, and the fence is provided with a bending piece. The present invention reduces the number of linkage rods through optimization, thus reducing the weight of children's bed. In addition, the cooperation of the unlocking component of the base and the annular limiting base facilitates folding, thereby realizing the purpose of rapid folding. Moreover, two ends of the butterfly-like sheet are rotatably connected to the sliding grooves and the connectors, respectively, which, cooperating with the limit clamping slot, can realize rapid rotation folding/limiting fixation, improve the folding stability, and reduce falling off caused by abrasion, thus leading to a long service life.

9 Claims, 9 Drawing Sheets

261

265

264

262

26

263

FOLDING FRAME

CROSS REFERENCE TO THE RELATED APPLICATIONS

This application is based upon and claims priority to Chinese Patent Applications No. 2025205961850 and 2025205966731, both filed on Apr. 1, 2025, the entire content of which are incorporated herein by reference.

TECHNICAL FIELD

The present invention mainly relates to the technical field of a folding frame.

BACKGROUND

Baby folding beds are a kind of simple beds designed based on the principle of joints, which can be folded and stored through various folding methods for convenience and to save space. Such beds are simple, practical, and convenient to store. The existing patent application number: 202320130629.2 discloses a folding bed structure, including a joint connecting member. The joint connecting member is symmetrically provided with two first sliding grooves near the upper part, and the distance between the two first sliding grooves gradually increases from top to bottom; the sides of the two first sliding grooves opposite to each other are provided with a second sliding groove, respectively; two upper surrounding rods are provided and located on two sides of the joint connecting member, the ends of the two upper surrounding rods close to each other are provided with a first guide pin, respectively, and the first guide pin is embedded in and can slide along the first sliding groove; the body of the upper surrounding rod is slidably connected with the joint connecting member, the body of the upper surrounding rod is provided with a second guide pin, and the second guide pin is slidably embedded in the second sliding groove; two lower surrounding rods are provided and arranged side by side below the two upper surrounding rods in a one-to-one correspondence; the ends of the two lower surrounding rods close to each other are slidably connected with the joint connecting member, respectively; the lower part of each mounting sleeve is connected to a support base through an upright rod, and each support base is hinged to an unlocking base arranged in the middle of the lower part of the bed body through a connecting rod group. Although this device discloses the joint connecting member for folding the fence, the guide pins and the sliding grooves are adopted for cooperation. During use, the folding stability is relatively poor, and long-term use and abrasion are likely to cause the guide pins to fall off, resulting in failure of folding.

SUMMARY

To solve the problems mentioned in the background above, the present invention provides a folding frame.

The present invention adopts the following technical solution: a folding frame includes a retractable folding component and a fence. The fence includes folding guardrails and upright rods, and the fence is provided with a bending piece.

The retractable folding component includes a base and an annular limiting base. The base is rotatably connected with four linkage rods. The linkage rods are rotatably connected to the base. The linkage rods each are movably connected with a support sheet. The support sheet is rotatably connected to the annular limiting base. The lower end of the base is connected with a movable tube. A resettable unlocking component is arranged in the movable tube. The annular limiting base is movable on the outer wall of the movable tube. The unlocking component cooperates with the annular limiting base.

The bending piece includes a folding member. The folding member is provided with folding openings. A connector is correspondingly connected in each folding opening in a rotatable manner. The side end of the folding member is provided with limit clamping slots. The folding member is symmetrically provided with sliding grooves. The sliding grooves are slidably connected with a butterfly-like sheet. The other end of the butterfly-like sheet is movably connected to the connector. The linkage rods are rotatably connected to the upright rods. Each upright rod is installed with a connecting member. In the present invention, two ends of the butterfly-like sheet are rotatably connected to the sliding grooves and the connectors, respectively, which, cooperating with the limit clamping slots, can realize rapid rotation folding/limiting fixation, improve the folding stability, and reduce falling off caused by abrasion, thus leading to a long service life.

Further, the unlocking component includes a spring, a pull column, a limiting tooth, a movable shaft, and a mounting base. The mounting base is engaged at the position corresponding to a lower end of the movable tube. The mounting base is provided with a movable groove. The limiting tooth is movably placed in the movable groove. The limiting tooth is rotatably connected with a rotating hole of the mounting base through a pin. The top of the mounting base is inserted into a connecting port of the pull column. The pull column is symmetrically provided with mounting holes. The mounting base is provided with a vertical groove. The limiting tooth is provided with a moving groove. The movable shaft penetrates through the mounting holes, the vertical groove, and the moving groove, and is slidably connected with the vertical groove and the moving groove. The top of the pull column is connected with the spring. The movable tube is provided with a slot. The limiting tooth extends out of the slot to cooperate with the annular limiting base.

Preferably, the pull column is provided with a through hole. The through hole is used for connecting a pull rope or a pull ring. The top of the base is provided with the opening for receiving the outwardly extending pull rope or pull ring.

Preferably, engaging teeth are arranged at opposite positions of the mounting base. The side wall of the movable tube is provided with engaging slots. The engaging teeth cooperate with the engaging slots. The lower edge of the mounting base is provided with a positioning tooth. The bottom of the movable tube is provided with a positioning slot. The positioning tooth is engaged with the positioning slot.

Preferably, the top of the pull column is symmetrically provided with T-shaped limiting columns. The lower end of the spring is sleeved outside the limiting columns. The base is provided with a plurality of grooves which are used for horizontally limiting and connecting the linkage rods.

Preferably, the folding guardrails include a first rail and a second rail. The first rail is rotatably connected with the upper portion of the folding member. The second rail is connected with the connector. The first rail is connected with a screw to contact limit clamping slots.

Preferably, each upright rod is provided with the connecting member for rotatably connecting with the first rail and the second rail. The upright rods are movably connected to the linkage rods. The linkage rods are movably connected to the base.

Preferably, the opposite positions of the linkage rods are connected with symmetrically arranged limiting rods. The middle position of each limiting rod is movably connected with a support leg.

Compared with the prior art, the present invention has the following beneficial effects:

1. The present invention reduces the number of linkage rods through optimization, thus reducing the weight of children's bed. In addition, the cooperation of the unlocking component of the base and the annular limiting base facilitates folding, thereby realizing the purpose of rapid folding. Moreover, two ends of the butterfly-like sheet are rotatably connected to the sliding grooves and the connectors, respectively, which, cooperating with the limit clamping slots, can realize rapid rotation folding/limiting fixation, improve the folding stability, and reduce falling off caused by abrasion, thus leading to a long service life.

2. In the present invention, the pull rope or pull ring connected in the through hole is pulled to drive the pull column, which in turn drives the movable shaft to move upward along the vertical groove. At the same time, the movable shaft moves in the moving groove to drive the limiting tooth to rotate around the pin in the movable groove, so that the limiting tooth is retracted from the slot to the movable groove, realizing rapid unlocking, thereby achieving unlocking by pulling and rapid folding.

3. In the present invention, through the cooperation of the first rail and the second rail with the corresponding folding opening and connector, rapid folding/limiting fixation of the folding guardrails can be realized, with simple operation.

4. In the present invention, the linkage rods are connected to the upright rods, and the upright rod connecting members are connected to the folding guardrails, which jointly accelerate the rapid folding of the folding frame and facilitate use. Through the cooperation of the folding guardrails, the upright rods, the linkage rods, the limiting rods, and the base, rapid folding/limiting fixation of the whole fence is realized, showing good practicability.

The present invention will be explained in detail below with reference to the accompanying drawings and specific embodiments.

In the figures: 1. folding guardrail; 11. first rail; 12. second rail; 13. folding member; 131. folding opening; 132. sliding groove; 133. limit clamping slot; 14. butterfly-like sheet; 15. connector; 2. base; 21. movable tube; 211. slot; 212. engaging slot; 213. positioning slot; 22. spring; 23. pull column; 231. mounting hole; 232. through hole; 233. limiting column; 234. connecting port; 24. limiting tooth; 241. moving groove; 242. pin; 25. movable shaft; 26. mounting base; 261. vertical groove; 262. engaging tooth; 263. positioning tooth; 264. rotating hole; 265. movable groove; 27. opening; 3. linkage rod; 31. support sheet; 32. annular limiting base; 4. limiting rod; 41. support leg; 5. upright rod; 51. connecting member.

DETAILED DESCRIPTION OF THE EMBODIMENTS

To facilitate the understanding of the present invention, the present invention will be comprehensively described with reference to the relevant accompanying drawings. The accompanying drawings show several embodiments of the present invention, but the present invention can be implemented in different forms and is not limited to the embodiments described herein. On the contrary, these embodiments are provided to make the disclosure of the present invention more thorough and comprehensive.

It should be noted that when an element is described as being "fixed to" another element, it can be directly on the another element or there may be an intermediate element. When an element is considered to be "connected" to another element, it can be directly connected to the another element or there may be an intermediate element at the same time. The terms "vertical", "horizontal", "left", "right", and similar expressions used herein are for illustrative purposes only.

Unless otherwise defined, all technical and scientific terms used herein have the same meaning as those commonly understood by those skilled in the art to which the present invention belongs. The terms used in the specification of the present invention are only for the purpose of describing specific embodiments and are not intended to limit the present invention. The term "and/or" used herein includes one or any and all combinations of more of the related listed items.

Figure 1:
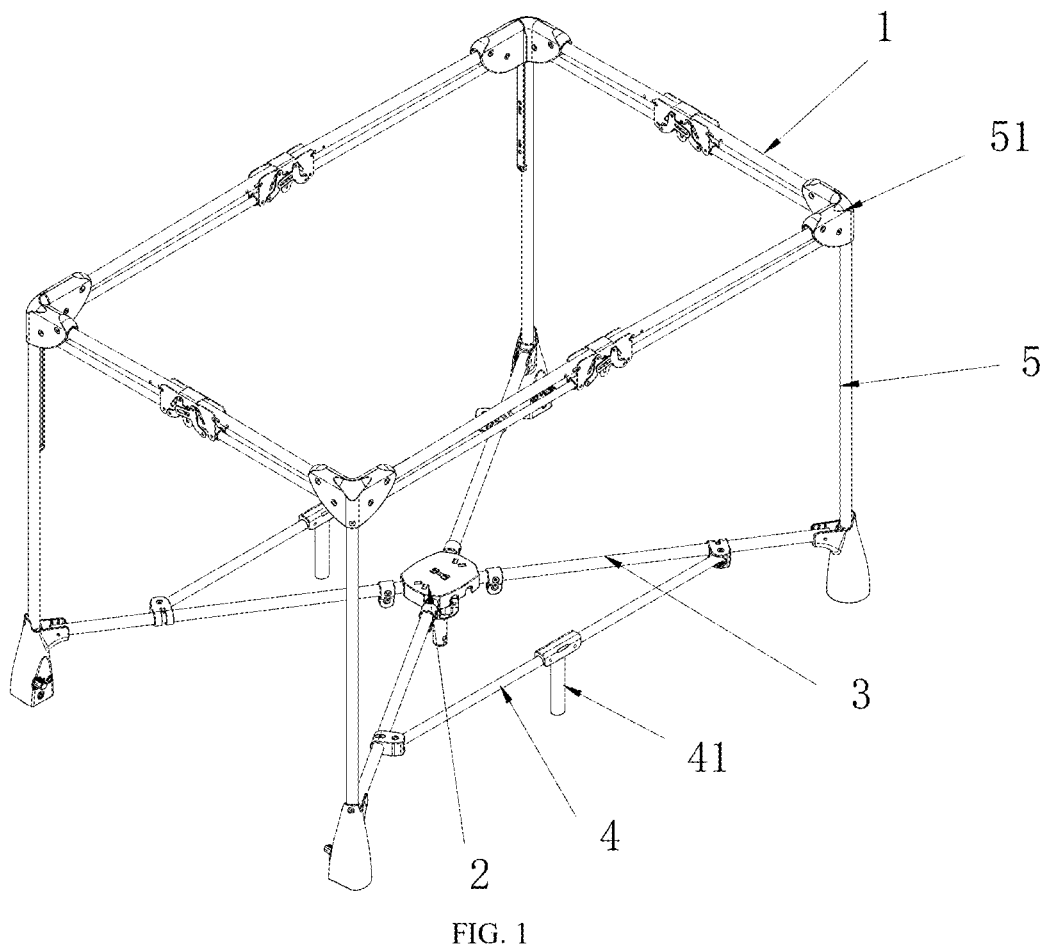
FIG. 1 is a schematic diagram of the overall structure of the present invention.
Figure 2:
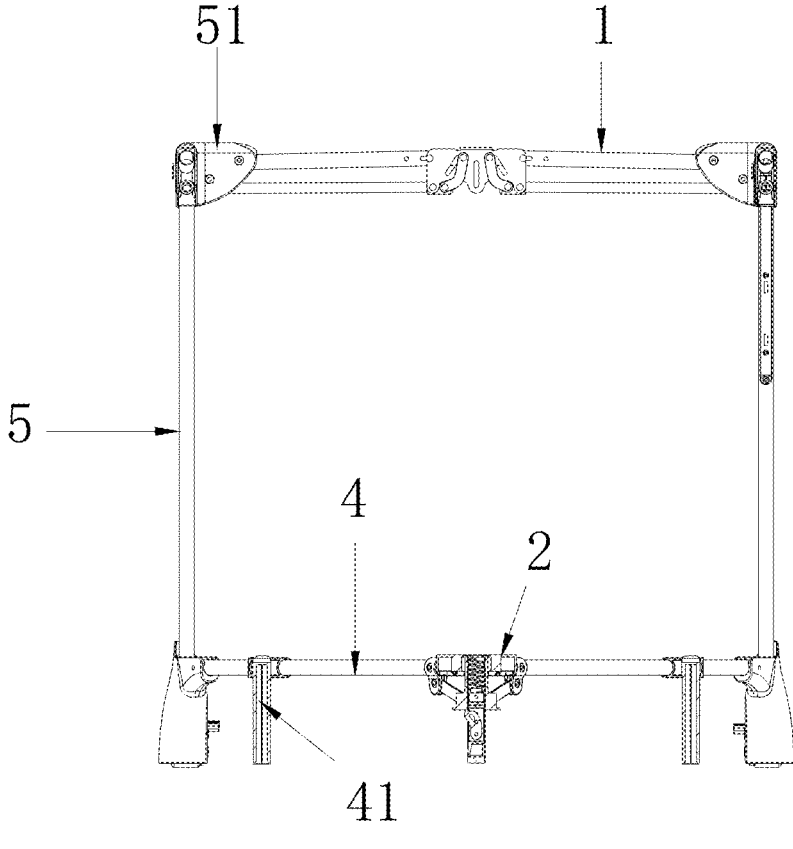
FIG. 2 is a cross-sectional view of the overall structure of the present invention.
Figure 3:
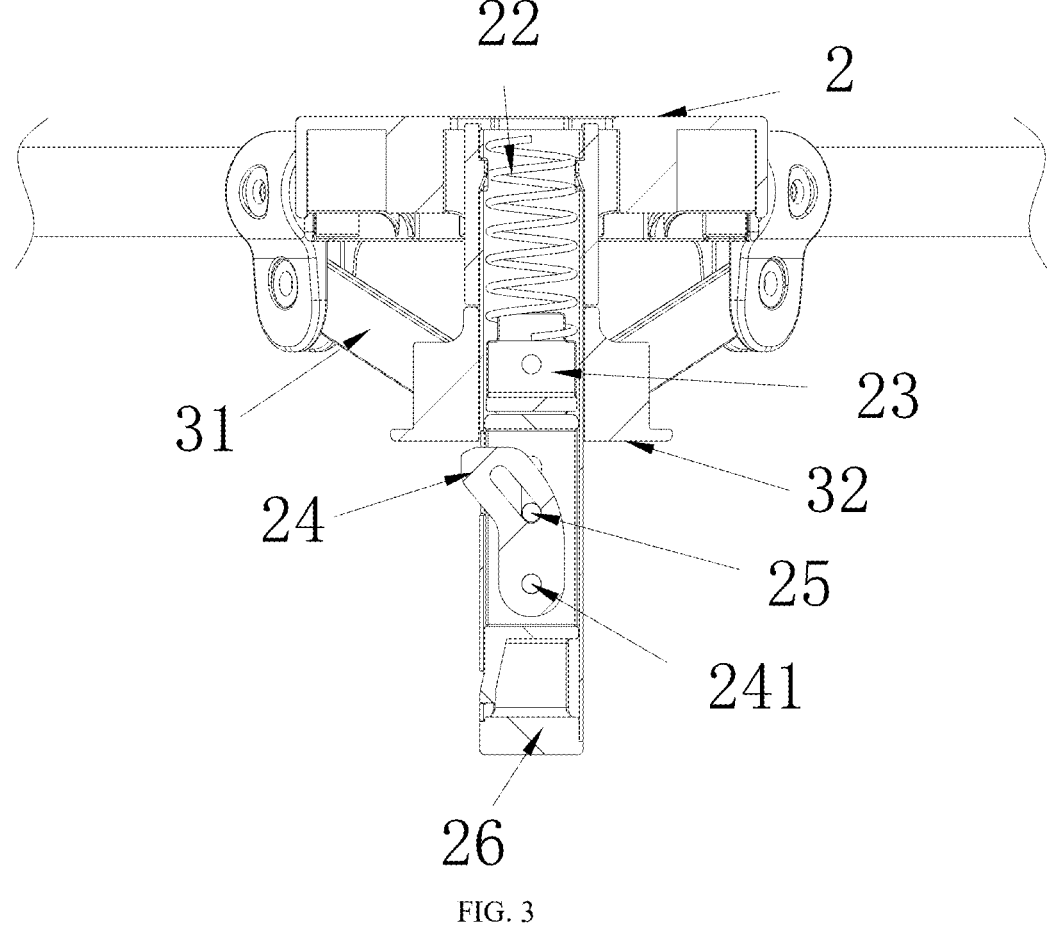
FIG. 3 is a cross-sectional view of the retractable folding component of the present invention.
Figure 4:
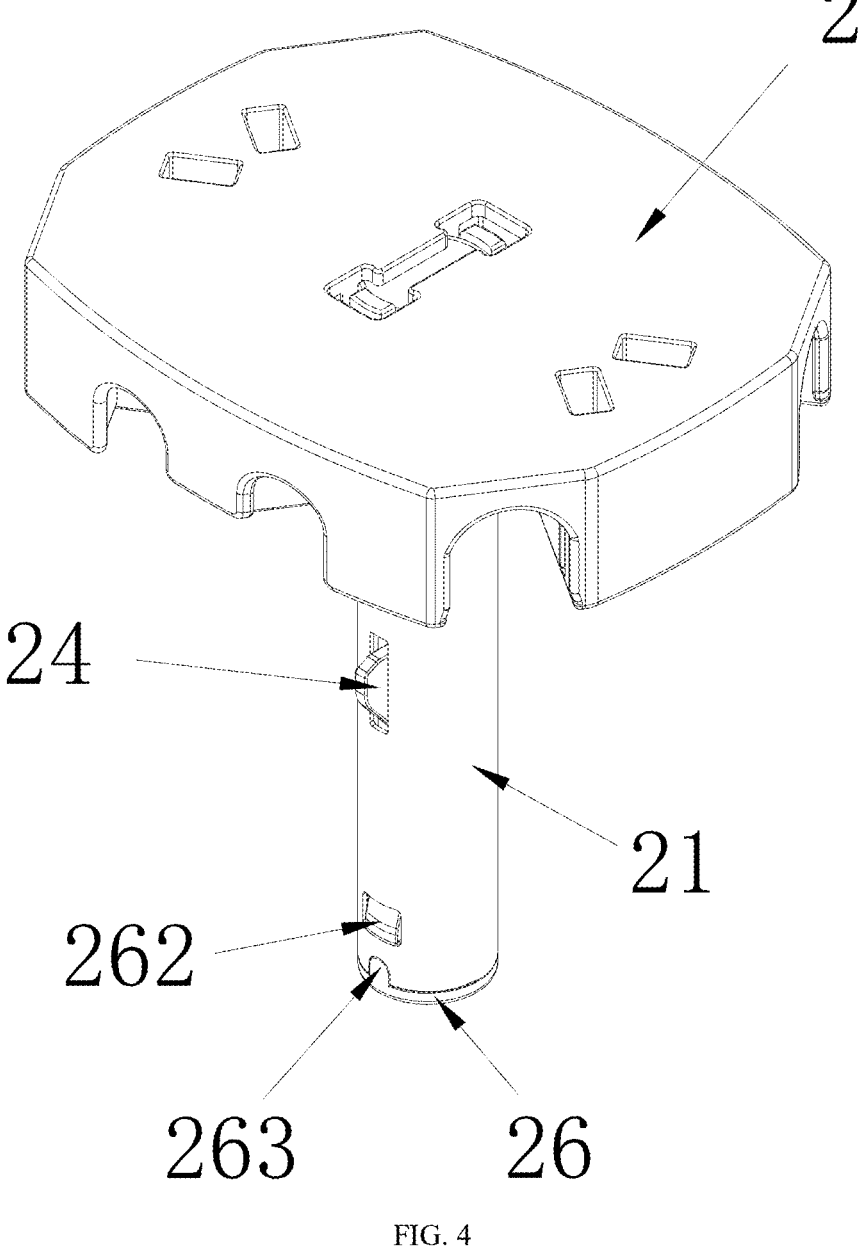
FIG. 4 is a schematic diagram of the retractable folding component of the present invention.
Figure 5:
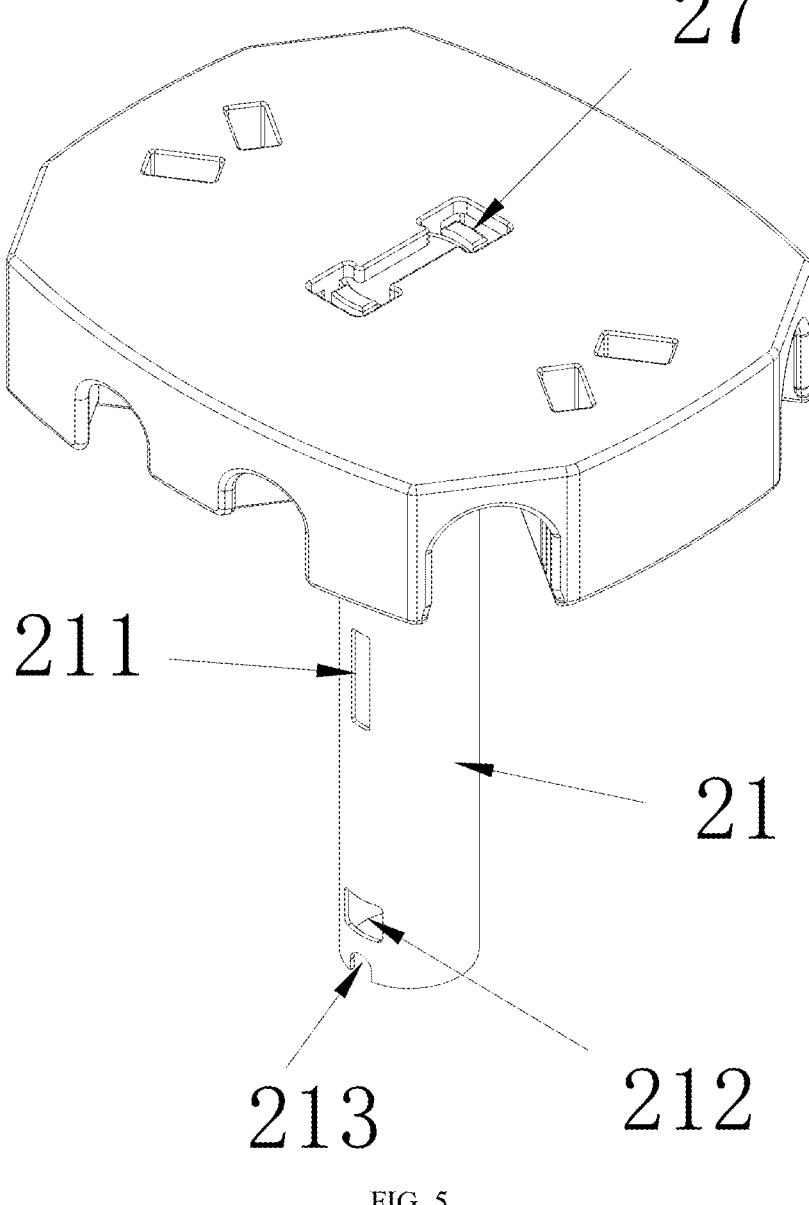
FIG. 5 is a schematic diagram showing the connection between the base and the movable tube of the present invention.
Figure 6:
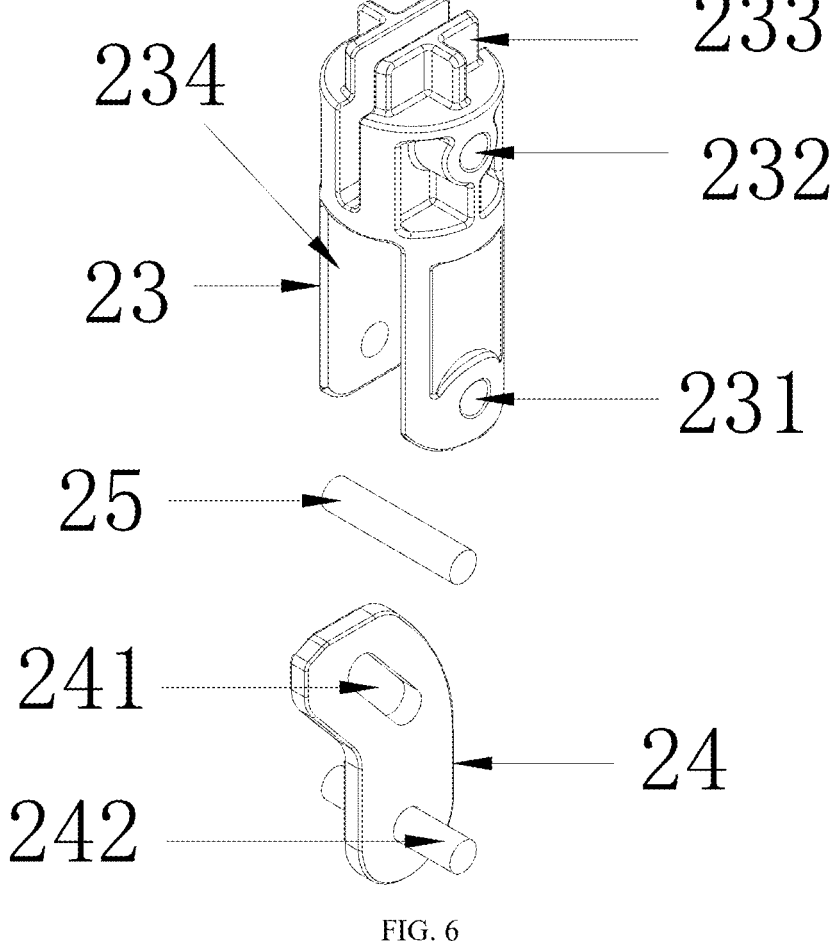
FIG. 6 is an exploded view showing a partial structure of the retractable folding component of the present invention.
Figure 7:
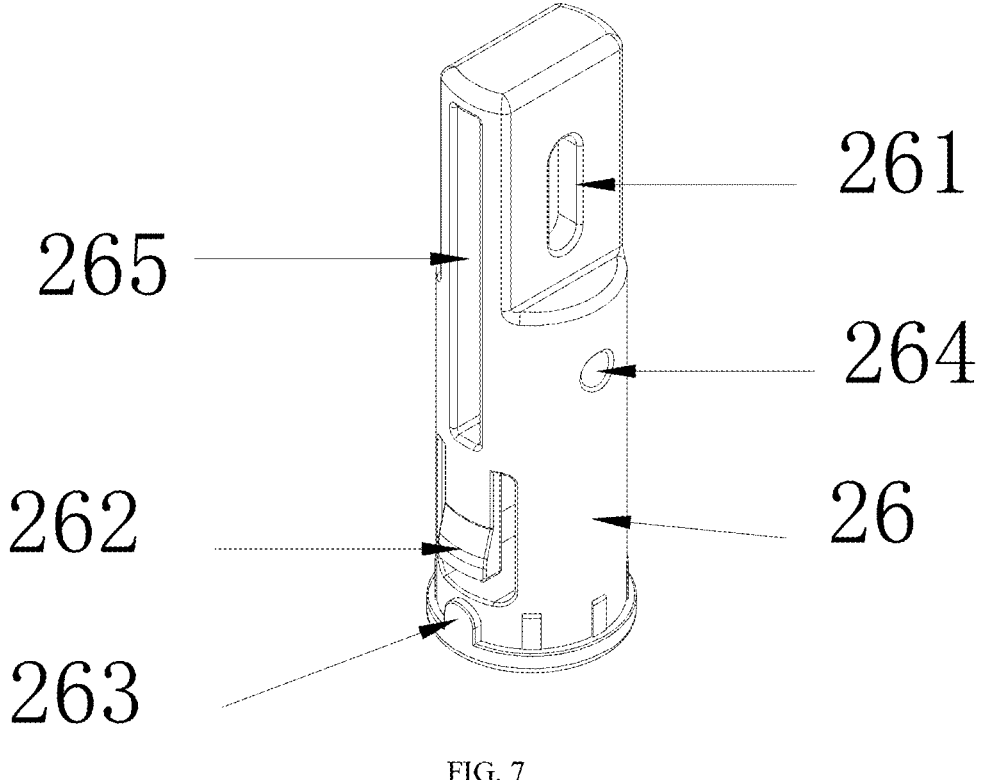
FIG. 7 is a schematic diagram showing structure of the mounting base of the retractable folding component of the present invention.
Figure 8:
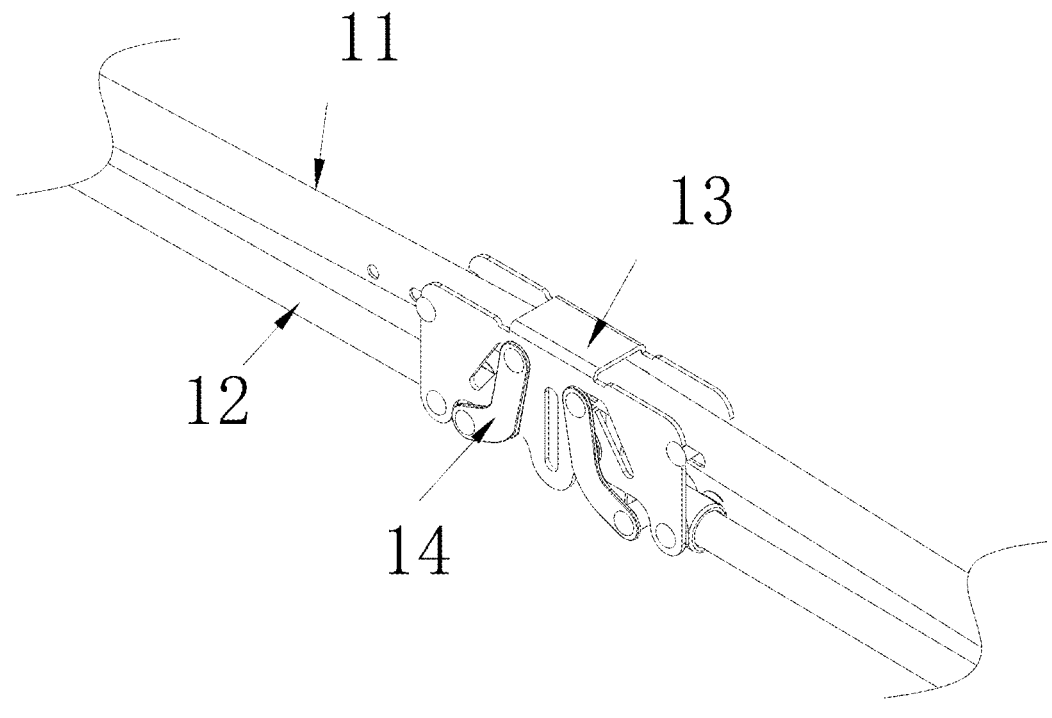
FIG. 8 is a schematic diagram showing the structure of the bending piece of the present invention.
Figure 9:
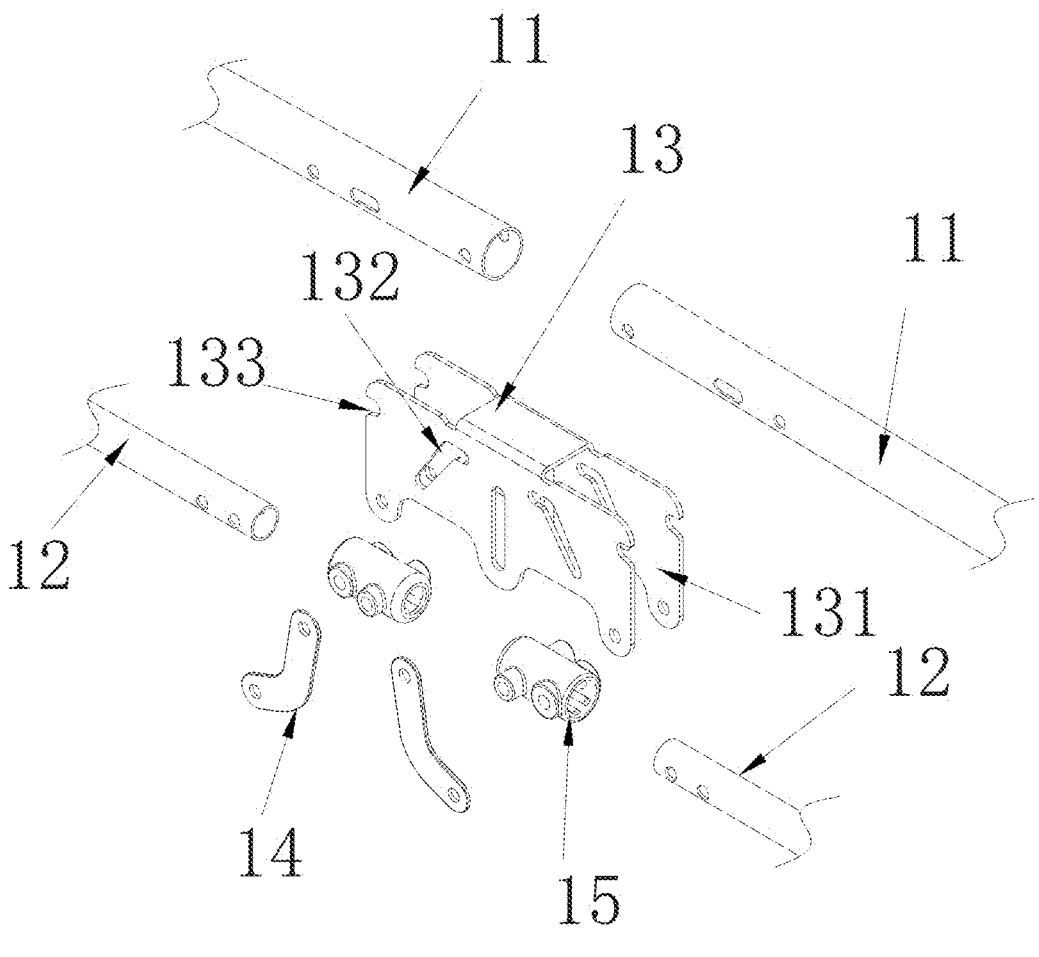
FIG. 9 is an exploded view showing the structure of the bending piece of the present invention.

Referring to FIGS. 1 to 9, a folding frame includes a retractable folding component and a fence. The fence includes folding guardrails 1 and upright rods 5; the fence is provided with a bending piece.

The retractable folding component includes a base 2 and an annular limiting base 32. The base 2 is rotatably connected with four linkage rods 3. The linkage rods 3 are rotatably connected to the base 2. The linkage rods 3 each are movably connected with a support sheet 31. The support sheet 31 is rotatably connected to the annular limiting base 32. The lower end of the base 2 is connected with a movable tube 21. A resettable unlocking component is arranged in the movable tube 21. The annular limiting base 32 is movable on the outer wall of the movable tube 21. The unlocking component cooperates with the annular limiting base 32.

The bending piece includes a folding member 13. The folding member 13 is provided with folding openings 131. A connector 15 is correspondingly connected in each folding opening 131 in a rotatable manner. The side end of the folding member 13 is provided with limit clamping slots 133. The folding member 13 is symmetrically provided with sliding grooves 132. The sliding grooves 132 are slidably connected with a butterfly-like sheet 14. The other end of the butterfly-like sheet 14 is movably connected to the connector 15. The linkage rods 3 are rotatably connected to the upright rods 5. Each upright rod 5 is installed with a connecting member 51. In the present invention, two ends of the butterfly-like sheet 14 are rotatably connected to the sliding grooves 132 and the connectors 15, respectively, which, cooperating with the limit clamping slots 133, can realize rapid rotation folding/limiting fixation, improve the folding stability, and reduce falling off caused by abrasion, thus leading to a long service life.

Further, the unlocking component includes a spring 22, a pull column 23, a limiting tooth 24, a movable shaft 25, and a mounting base 26. The mounting base 26 is engaged at the position corresponding to a lower end of the movable tube 21. The mounting base 26 is provided with a movable groove 265. The limiting tooth 24 is movably placed in the movable groove 265. The limiting tooth 24 is rotatably connected with a rotating hole 264 of the mounting base 26 through a pin 242. The top of the mounting base 26 is inserted into a connecting port 234 of the pull column 23. The pull column 23 is symmetrically provided with mounting holes 231. The mounting base 26 is provided with a vertical groove 261. The limiting tooth 24 is provided with a moving groove 241. The movable shaft penetrates through the mounting holes 231, the vertical groove 261, and the moving groove 241, and is slidably connected with the vertical groove 261 and the moving groove 241. The top of the pull column 23 is connected with the spring 22. The movable tube 21 is provided with a slot 211. The limiting tooth 24 extends out of the slot 211 to cooperate with the annular limiting base 32. Two ends of the butterfly-like sheet 14 are rotatably connected to the sliding grooves 132 and the connectors 15, respectively, which, cooperating with the limit clamping slots 133, can realize rapid rotation folding/limiting fixation, improve the folding stability, and reduce falling off caused by abrasion, thus leading to a long service life.

Specifically, the pull column 23 is provided with a through hole 232. The through hole 232 is used for connecting a pull rope or a pull ring. The top of the base 2 is provided with the opening 27 for receiving the outwardly extending pull rope or pull ring.

Preferably, engaging teeth 262 are arranged at opposite positions of the mounting base 26. The side wall of the movable tube 21 is provided with engaging slots 212. The engaging teeth 262 cooperate with the engaging slots 212. The lower edge of the mounting base 26 is provided with a positioning tooth 263. The bottom of the movable tube 21 is provided with a positioning slot 213. The positioning tooth 263 is engaged with the positioning slot 213.

Further, the top of the pull column 23 is symmetrically provided with T-shaped limiting columns 233. The lower end of the spring 22 is sleeved outside the limiting columns 233. The base 2 is provided with a plurality of grooves which are used for horizontally limiting and connecting the linkage rods 3.

Specifically, the folding guardrails 1 include a first rail 11 and a second rail 12. The first rail 11 is rotatably connected with the upper portion of the folding member 13. The second rail 12 is connected with the connector 15. The first rail 11 is connected with a screw to contact limit clamping slots 133. Through the cooperation of the first rail 11 and the second rail 12 with the corresponding folding opening 131 and connector 15, rapid folding/limiting fixation of the folding guardrails 1 can be realized, with simple operation.

Further, each upright rod 5 is provided with the connecting member 51 for rotatably connecting with the first rail 11 and the second rail 12. The upright rods 5 are movably connected to the linkage rods 3. The linkage rods 3 are movably connected to the base 2. The opposite positions of the linkage rods 3 are connected with symmetrically arranged limiting rods 4. The middle position of each limiting rod 4 is movably connected with a support leg 41. Through the cooperation of the folding guardrails 1, the upright rods 5, the linkage rods 3, the limiting rods 4, and the base 2, rapid folding/limiting fixation of the whole fence is realized, showing good practicability.

The folding frame of the present invention is implemented as follows:

When unlocking and folding: the pull rope or pull ring connected in the through hole can be pulled to drive the pull column 23, which in turn drives the movable shaft 25 to move upward along the vertical groove 261. At the same time, the movable shaft 25 moves in the moving groove 241 to drive the limiting tooth 24 to rotate around the pin 242 in the movable groove 265, so that the limiting tooth 24 is retracted from the slot 211 to the movable groove 265, realizing rapid unlocking of the annular limiting base 32. The annular limiting base 32 moves upward to rotate the support sheets 31, which in turn rotates the linkage rods 3 downward relative to the base 2 for folding, and drives the limiting rods 4 to rotate and fold accordingly.

During use and fixing: the annular limiting base 32 is pushed to move downward along the movable tube 21, which drives the linkage rods 3 to rotate upward and embed into the grooves of the base 2 to reach a horizontal position. The spring 22 pushes the pull column 23, and the pull column 23 pushes the movable shaft 25 to move downward along the vertical groove 261 and meanwhile move in the moving groove 241, so that the limiting tooth 24 rotates around the pin 242 in the movable groove 265 and extends out of the slot 211 to fix the annular limiting base 32.

The above is an exemplary description of the present invention with reference to the accompanying drawings. It is obvious that the specific implementation of the present invention is not limited by the above manners. As long as the methodical concept and technical solution of the present invention are adopted for such non-substantial improvements, or the concept and technical solution of the present invention are directly applied to other occasions without modification, they are all within the protection scope of the present invention.

What is claimed is:

1. A folding frame, comprising: a retractable folding component and a fence, wherein the fence comprises folding guardrails (1) and upright rods (5), and the fence is provided with a bending piece;

the retractable folding component comprises a base (2) and an annular limiting base (32), the base (2) is rotatably connected with four linkage rods (3), the linkage rods (3) are rotatably connected to the base (2), the linkage rods (3) each are movably connected with a support sheet (31), the support sheet (31) is rotatably connected to the annular limiting base (32), a lower end of the base (2) is connected with a movable tube (21), a resettable unlocking component is arranged in the movable tube (21), the annular limiting base (32) is movable on an outer wall of the movable tube (21), and the unlocking component cooperates with the annular limiting base (32);

the bending piece comprises a folding member (13), the folding member (13) is provided with folding openings (131), a connector (15) is correspondingly connected in each folding opening (131) in a rotatable manner, a side end of the folding member (13) is provided with limit clamping slots, the folding member (13) is symmetrically provided with sliding grooves (132), the sliding grooves (132) are slidably connected with a butterfly-like sheet (14), the other end of the butterfly-like sheet (14) is movably connected to the connector (15), the linkage rods (3) are rotatably connected to the upright rods (5), and each upright rod (5) is installed with a connecting member (51);

the unlocking component comprises a spring (22), a pull column (23), a limiting tooth (24), a movable shaft (25), and a mounting base (26), the mounting base (26) is engaged at a position corresponding to a lower end of the movable tube (21), the mounting base (26) is provided with a movable groove (265), the limiting tooth (24) is movably placed in the movable groove (265), the limiting tooth (24) is rotatably connected with a rotating hole (264) of the mounting base (26) through a pin (242), a top of the mounting base (26) is inserted into a connecting port (234) of the pull column (23), the pull column (23) is symmetrically provided with mounting holes (231), the mounting base (26) is provided with a vertical groove (261), the limiting tooth (24) is provided with a moving groove (241), the movable shaft penetrates through the mounting holes (231), the vertical groove (261), and the moving groove (241), and is slidably connected with the vertical groove (261) and the moving groove (241), a top of the pull column (23) is connected with the spring (22), the movable tube (21) is provided with a slot (211), and the limiting tooth (24) extends out of the slot (211) to cooperate with the annular limiting base (32).

2. The folding frame according to claim 1, wherein the pull column (23) is provided with a through hole (231), the through hole (231) is used for connecting a pull rope or a pull ring, and the top of the base (2) is provided with the opening (27) for receiving the outwardly extending pull rope or pull ring.

3. The folding frame according to claim 2, wherein engaging teeth (262) are arranged at opposite positions of the mounting base (26), a side wall of the movable tube (21) is provided with engaging slots (212), and the engaging teeth (262) cooperate with the engaging slots (212); a lower edge of the mounting base (26) is provided with a positioning tooth (263), a bottom of the movable tube (21) is provided with a positioning slot (213), and the positioning tooth (263) is engaged with the positioning slot (213).

4. The folding frame according to claim 3, wherein a top of the pull column (23) is symmetrically provided with T-shaped limiting columns (233), and a lower end of the spring (22) is sleeved outside the limiting columns (233).

5. The folding frame according to claim 4, wherein the base (2) is provided with a plurality of grooves, and the grooves are used for horizontally limiting and connecting the linkage rods (3).

6. The folding frame according to claim 5, wherein the folding guardrails (1) comprise a first rail (11) and a second rail (12), the first rail (11) is rotatably connected with an upper portion of the folding member (13), and the second rail (12) is connected with the connector (5).

7. The folding frame according to claim 6, wherein the first rail (11) is connected with a screw to contact the limit clamping slots (133).

8. The folding frame according to claim 7, wherein each upright rod (5) is provided with the connecting member (51) for rotatably connecting with the first rail (11) and the second rail (12), the upright rods (51) are movably connected to the linkage rods (3), and the linkage rods (3) are movably connected to the base (2).

9. The folding frame according to claim 8, wherein opposite positions of the linkage rods (3) are connected with symmetrically arranged limiting rods (4), and a middle position of each limiting rod (4) is movably connected with a support leg (41).

\* \* \* \* \*